(12) United States Patent
Cowley et al.

(10) Patent No.: US 8,279,355 B2
(45) Date of Patent: Oct. 2, 2012

(54) METHOD AND APPARATUS TO SUPPORT MULTI-CHANNEL RECEPTION

(75) Inventors: Nick P. Cowley, Wiltshire (GB);
Richard J. Goldman, Cirencester (GB);
Isaac Ali, Bristol (GB)

(73) Assignee: Intel Corporation, Santa Clara, CA (US)

( * ) Notice: Subject to any disclaimer, the term of this patent is extended or adjusted under 35 U.S.C. 154(b) by 481 days.

(21) Appl. No.: 12/567,670

(22) Filed: Sep. 25, 2009

(65) Prior Publication Data

US 2011/0075034 A1 Mar. 31, 2011

(51) Int. Cl.
*H04N 5/44* (2006.01)
*H04N 5/50* (2006.01)
*H04B 17/02* (2006.01)

(52) U.S. Cl. .......................... 348/725; 348/731; 455/137

(58) Field of Classification Search .................. 348/725, 348/731, 706; 455/132, 137; 375/316; 725/68, 725/71, 73
See application file for complete search history.

(56) References Cited

U.S. PATENT DOCUMENTS

| | | | | |
|---|---|---|---|---|
| 5,450,392 A | * | 9/1995 | Waltrich | 370/201 |
| 6,021,323 A | * | 2/2000 | Vagher | 455/324 |
| 6,104,908 A | * | 8/2000 | Schaffner et al. | 725/78 |
| 6,622,307 B1 | * | 9/2003 | Ho | 725/120 |
| 7,102,699 B2 | * | 9/2006 | Rodolico | 348/723 |
| 8,019,300 B2 | * | 9/2011 | Kim et al. | 455/179.1 |
| 2002/0013133 A1 | * | 1/2002 | Lam | 455/137 |
| 2002/0181627 A1 | * | 12/2002 | Wengler | 375/347 |
| 2006/0094379 A1 | * | 5/2006 | Gamo | 455/137 |

FOREIGN PATENT DOCUMENTS

| | | |
|---|---|---|
| JP | 2000-152106 A | 5/2000 |
| KR | 2009-0009534 A | 1/2009 |
| KR | 2010-0013152 A | 2/2010 |
| WO | WO 2006-109477 A1 | 10/2006 |

OTHER PUBLICATIONS

International Search Report with Written Opinion corresponding to International Application PCT/US2010/048219, dated May 30, 2011, 8 pages.

* cited by examiner

*Primary Examiner* — Victor Kostak
(74) *Attorney, Agent, or Firm* — Pillsbury Winthrop Shaw Pittman LLP

(57) ABSTRACT

In accordance with various aspects of the disclosure, a method and apparatus for receiving multiple channels from a broadcast source and interfacing to multiple demodulators within a common silicon implementation is disclosed. A receiver apparatus is disclosed that may aggregate multiple channels output by multiple tuners into at least one composite signal. The at least one composite signal may be passed to a single ADC. The channels may then be extracted from the at least one composite signal in the digital domain prior to demodulation in separate demodulators.

18 Claims, 3 Drawing Sheets

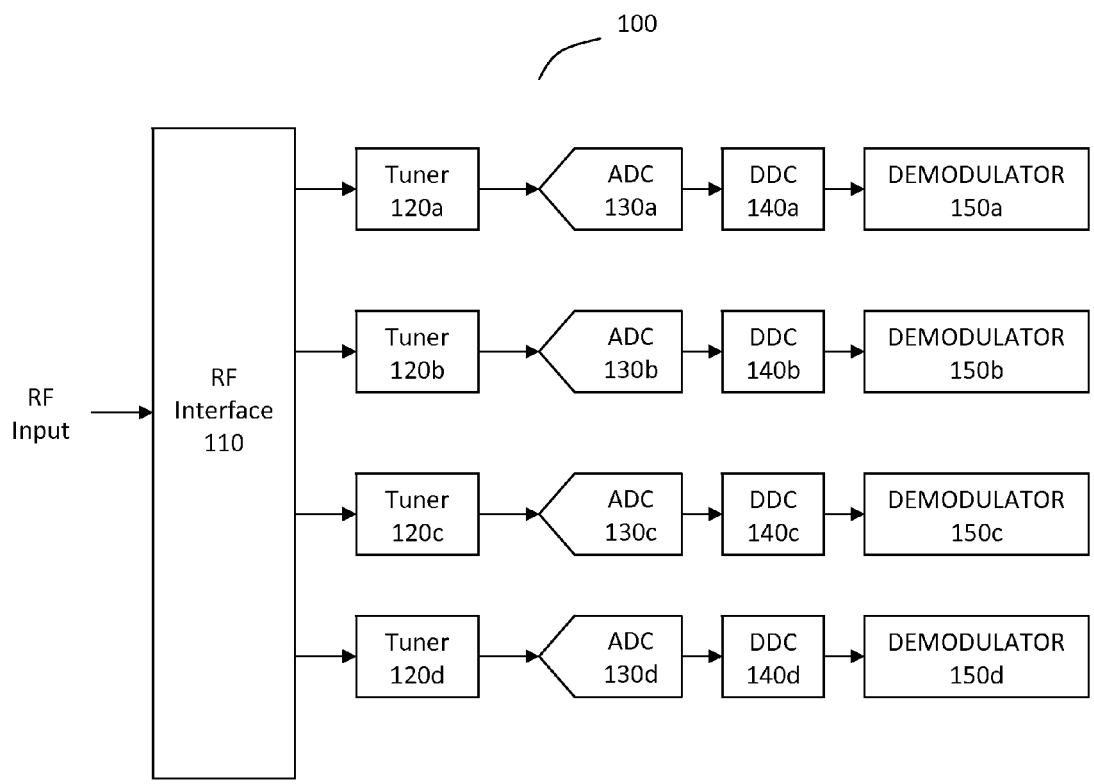
FIG. 1 (CONVENTIONAL)

METHOD AND APPARATUS TO SUPPORT MULTI-CHANNEL RECEPTION

BACKGROUND

This disclosure relates generally to a method and apparatus for receiving and selecting a plurality of channels associated with cable and broadcast systems, including but not limited to, for example, digital satellite broadcast systems, terrestrial broadcast systems, and/or cable/digital television distribution systems.

FIG. 1 depicts a conventional receiver 100 for receiving a plurality of channels. For sake of clarity, FIG. 1 depicts the receiver 100 configured to receive four independent channels. In operation, an RF interface 110 is configured to receive an RF broadband signal as input. The RF broadband signal may comprise a plurality of channels. The received plurality of channels may be passed through four identical receiver paths, each of which contain a tuner, a dedicated ADC (analog-to-digital converter), a DDC (digital down converter), and a demodulator. Each tuner 120a, 120b, 120c, 120d selects a desired channel from the received spectrum and converts the selected channel to an output frequency signal, which is then passed to a dedicated ADC 130a, 130b, 130c, 130d that converts the selected channel to digital domain. The DDC 140a, 140b, 140c, 140d down-converts the digital signal received from the ADC and the demodulator 150a, 150b, 150c, 150d extracts the original modulating data from the down-converted signal.

As such, a conventional receiver requires an independent interface between the tuner and ADC, and separate ADCs for each channel received. For example, as depicted in FIG. 1, four receiver paths including four dedicated ADCs are used to receive four channels, thereby increasing the die area required on SoC (system-on-a-chip) to implement at least the ADC function.

BRIEF DESCRIPTION OF THE DRAWINGS

FIG. 1 shows a conventional receiver apparatus.

DETAILED DESCRIPTION

Figure 2:
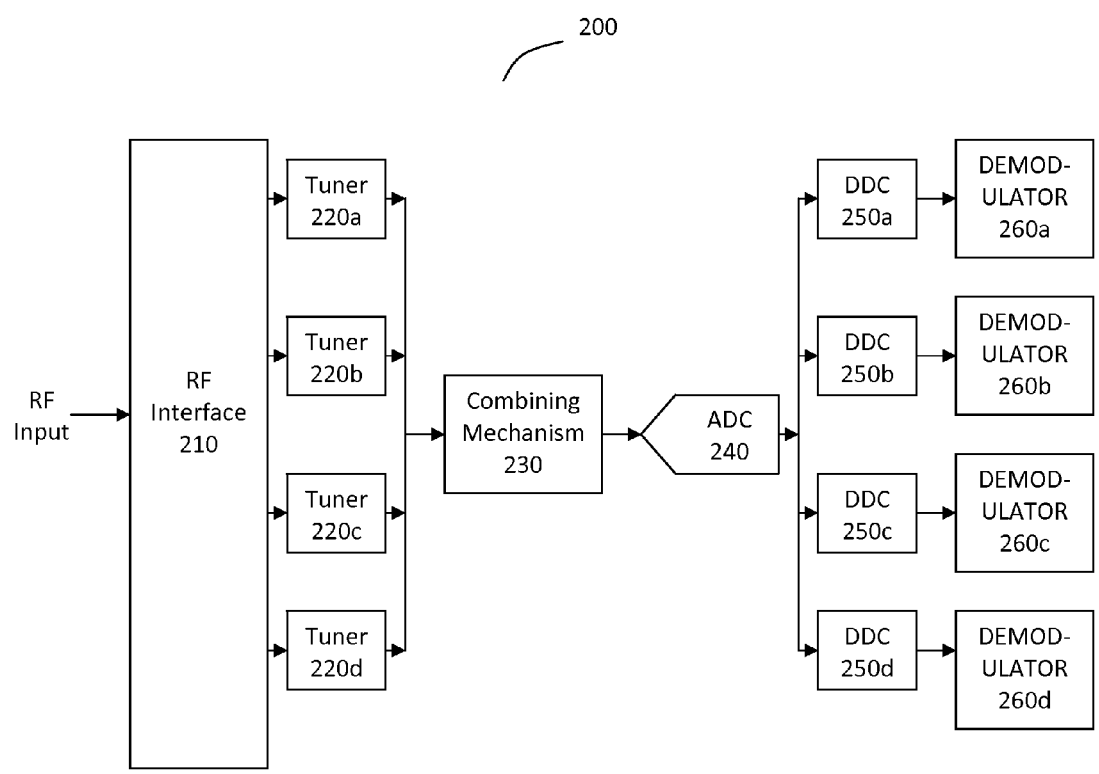
FIG. 2 shows an exemplary receiver apparatus in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

In accordance with various embodiments of this disclosure, a receiver apparatus is disclosed comprising an RF interface configured to receive an RF broadband signal comprising a plurality of channels; a plurality of tuners, each tuner of the plurality of tuners configured to select at least one channel from the plurality of channels and convert the selected channel to an intermediate frequency signal, wherein the plurality of tuners are configured to provide a plurality of intermediate frequency signals; a combining mechanism configured to receive and combine the plurality of intermediate frequency signals to form at least one composite signal; and an analog-to-digital converter configured to receive the at least one composite signal from the combining mechanism and convert the at least one composite signal to at least one digital composite signal.

In accordance with various embodiments of this disclosure, a method is disclosed that includes receiving an RF broadband signal comprising a plurality of channels; converting each of the plurality of channels into an intermediate frequency signal to provide a plurality of intermediate frequency signals; combining the plurality of intermediate frequency signals to form at least one composite signal; and converting the at least one composite signal to at least one digital composite signal.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

Turning now to the various aspects of the disclosure, an efficient method and apparatus for receiving multiple channels from a broadcast source and interfacing to multiple demodulators within a common silicon implementation is disclosed. A receiver apparatus is disclosed that may aggregate multiple channels output by multiple tuners into at least one composite signal. The at least one composite signal may be passed to a single ADC within a SoC (system-on-a-chip). The channels may then be extracted from the at least one composite signal in the digital domain prior to demodulation in separate demodulators. In doing so, the die area required on the SoC to implement the ADC function may be significantly reduced, thereby providing significant cost and power reductions.

FIG. 2 shows an exemplary receiver apparatus 200 in accordance with various aspects of the present disclosure. For sake of clarity, FIG. 2 depicts the receiver 200 configured to receive four independent channels, though the disclosure is not limited to four channels. An RF interface 210 may be configured to receive an RF broadband signal as input from a broadcast source. The broadcast source may include, but not be limited to, a digital satellite broadcast source, a terrestrial broadcast source, a cable/digital television distribution source, and/or other broadcast sources without departing from the scope of the disclosure. The RF broadband signal may include one or more signals from different media, for example, satellite media, cable media, and/or other broadcast media. The RF broadband signal may comprise a plurality of channels. RF interface 210 may receive the RF broadband signal and may pass four identical copies of the signal to tuners 220a, 220b, 220c, and 220d respectively.

Each of the tuners 220a, 220b, 220c, 220d may be configured to select at least one channel from the plurality of channels in the RF broadband signal and convert the selected channel to an intermediate frequency (IF) signal, a zero intermediate frequency (ZIF) signal, or a near-zero intermediate frequency (NZIF) signal. In some implementations, at least one of the tuners may be configured to convert a selected channel to a zero intermediate frequency signal and the remaining tuners may be configured to convert the respective selected channels to intermediate frequency signals.

Combining mechanism 230 may be configured to receive the signals from each of the tuners 220a, 220b, 220c, 220d, and combine the signals to form at least one composite signal. ADC 240 may be configured to receive the at least one composite signal from combining mechanism 230 and convert the at least one composite signal to at least one digital composite signal. The digital composite signal may be provided to each of DDCs 250a, 250b, 250c, 250d. Each DDC may be configured to down-convert the digital composite signal to a baseband signal centered at zero frequency. Each DDC may be configured to extract the desired selected channel associated with one of the tuners from the digital composite signal using appropriate digital signal processing techniques. For example, DDC 250a may extract the desired selected channel associated with tuner 220a from the digital composite signal, DDC 250b may extract the desired selected channel associated with tuner 220b from the digital composite signal, and so forth. The extracted channels may be in baseband form. Demodulators 260a, 260b, 260c, 260d may receive the extracted channels and demodulate the channels to extract the original modulating data from the channels.

As can be seen in FIG. 2, the ADC count is reduced from four (as in conventional receiver of FIG. 1) to one, thereby offering significant die area and associated cost saving on the SoC. The number of interface pins between the RF domain and SoC is reduced and the area required for the ADC function in the SoC is reduced, both of which may provide a significant impact on the overall implementation cost and power.

Combining mechanism 230 may receive, for example, an intermediate frequency (IF) signal that is output by each of the tuners 220a, 220b, 220c, 220d and may comprise at least one summation circuit that may be configured to combine the outputs of the tuners 220a, 220b, 220c, 220d. Depending on the output of the tuners, the summation circuit may comprise a wired AND function.

The IF signal output by each tuner may comprise an in-phase component (I-component) and a quadrature component (Q-component). In some implementations, each tuner may output an IF signal containing quadrature components, i.e., two identically modulated streams (referred to as I and Q components) occupying the same bandwidth with a quadrature phase relationship. The I and Q outputs from each tuner may occupy a different frequency band so as to allow the I components to be separately aggregated and the Q components to be separately aggregated. Combining mechanism 230 may separately combine the I component of each of the IF signals from tuners 220a, 220b, 220c, 220d to form a substantially contiguous in-phase composite signal (I composite signal). Combining mechanism 230 may separately combine the Q component of each of the IF signals from tuners 220a, 220b, 220c, 220d to form a substantially contiguous quadrature composite signal (Q composite signal). Combining mechanism 230 may include two summation circuits, one to receive as input and combine the I components from the tuners and the second to receive as input and combine the Q components from the tuners.

Combining mechanism 230 may pass the I composite signal and the Q composite signal to a single ADC 240 that converts the two composite signals to two I and Q digital composite signals. ADC 240 samples alternately between the I composite signal and the Q composite signal and generates a digital representation of the signals. ADC 240 may contain retiming and interpolation circuits to generate I and Q samples that are time coherent from the two sample time offset streams.

In some implementations, combining mechanism 230 may form an aggregate composite signal which may contain the I components from all the tuners placed next to each other in the frequency domain (so as to form a substantially contiguous in-phase composite signal) and the Q components from all the tuners placed next to each other in the frequency domain (so as to form a substantially contiguous quadrature composite signal). As such, combining mechanism may form a single composite signal that may represent the aggregate composite signal including the substantially contiguous in-phase composite signal and the substantially contiguous quadrature composite signal. Combining mechanism 230 may pass the single composite signal to a single ADC 240 that converts the single composite signal to a single digital composite signal.

ADC 240 may pass the digital composite signal(s) (i.e., either the two I and Q digital composite signals or the single digital composite signal) to each of the DDCs 250a, 250b, 250c, 250d. Each DDC may receive the ADC output in parallel and may process the digital composite signal(s) to extract a desired selected channel associated with one of the tuners from the digital composite signal(s) using appropriate digital signal processing techniques. Each DDC may down-convert the desired selected channel from composite to baseband. In other words, each DDC may down-convert to zero Hz the frequency information in digital composite signal(s) respective to a particular tuner. For example, DDC 250a may down-convert the desired selected channel of tuner 220a from composite to baseband, DDC 250b may down-convert the desired selected channel of tuner 220b from composite to baseband and so forth. After the DDC has processed the composite signal(s), the extracted selected channels from the DDCs 250a, 250b, 250c, 250d are passed to demodulators 260a, 260b, 260c, 260d respectively. The demodulators may process and demodulate the channels as required by the modulation standard in accordance with known techniques.

In some cases, two ADCs may be used, where one ADC may be used for processing the I components and the other ADC may be used for processing the Q components separately. The output of the two ADCs may then be provided to the DDCs 250a, 250b, 250c, 250d. The use of two ADCs may still provide an advantage over the conventional receiver of FIG. 1 because the number of ADC's is reduced from four to two.

This approach (where an IF signal containing two modulated streams with quadrature phase relationship is output by each tuner), regardless of whether a single ADC is used or two ADCs are used, allows different tuner outputs (e.g., the in-phase and quadrature outputs of the tuner) to occupy the same positive and negative frequencies. For example, an IF signal output by one tuner may have I component leading Q component at frequency of +10 Mhz while an IF signal output by another tuner may have I component leading Q component at frequency of −10 Mhz, such that spatially they would occupy the same frequency albeit there is a quadrature phase relationship inversion between the two IF outputs.

Having independent I and Q components allows the DDCs 250a, 25b, 250c, 250d to extract channels that have the same phase relationship between the I and Q components in the positive or negative frequency plane by converting with appropriate phase relationship signals using, for example, a single sideband down-conversion technique (also known as image reject down-conversion).

In some implementations, instead of outputting an IF signal containing two identically modulated streams occupying the same bandwidth with a quadrature phase relationship, each tuner may output an IF signal comprising the original channel data modulated on a single carrier. In this case, each tuner may comprise a dual conversion architecture involving an internal quadrature component, wherein a second stage may perform an image reject quadrature conversion to output the IF signal. It will be understood that other tuner architectures may be utilized without departing from the scope of this disclosure. The IF signals output from each tuner may occupy different parts of the frequency spectrum.

The IF signals output from each tuner may be combined by combining mechanism 230 to form a single composite signal. Combining mechanism 230 may pass the single composite signal to a single ADC 240 that converts the single composite signal to a digital composite signal. ADC 240 may pass the digital composite signal to each of the DDCs 250a, 250b, 250c, 250d. Each DDC may receive the ADC output in parallel and may process the digital composite signal to extract a desired selected channel associated with one of the tuners from the digital composite signal using appropriate digital signal processing techniques. Each DDC may down-convert the desired selected channel from composite to baseband. In other words, each DDC may down-convert to zero Hz the frequency information in digital composite signal respective to a particular tuner. For example, DDC 250a may down-convert the desired selected channel of tuner 220a from composite to baseband, DDC 250b may down-convert the desired selected channel of tuner 220b from composite to baseband and so forth. After the DDC has processed the composite signal, the extracted selected channels from the DDCs 250a, 250b, 250c, 250d are passed to demodulators 260a, 260b, 260c, 260d respectively. The demodulators may process and demodulate the channels as required by the modulation standard in accordance with known techniques.

In some implementations, each DDC may translate the digital composite signal to outputs with quadrature phase relationships. In other words, each DDC may perform an I and Q separation, such that the DDC may process the I and Q output in baseband domain.

Figure 3:
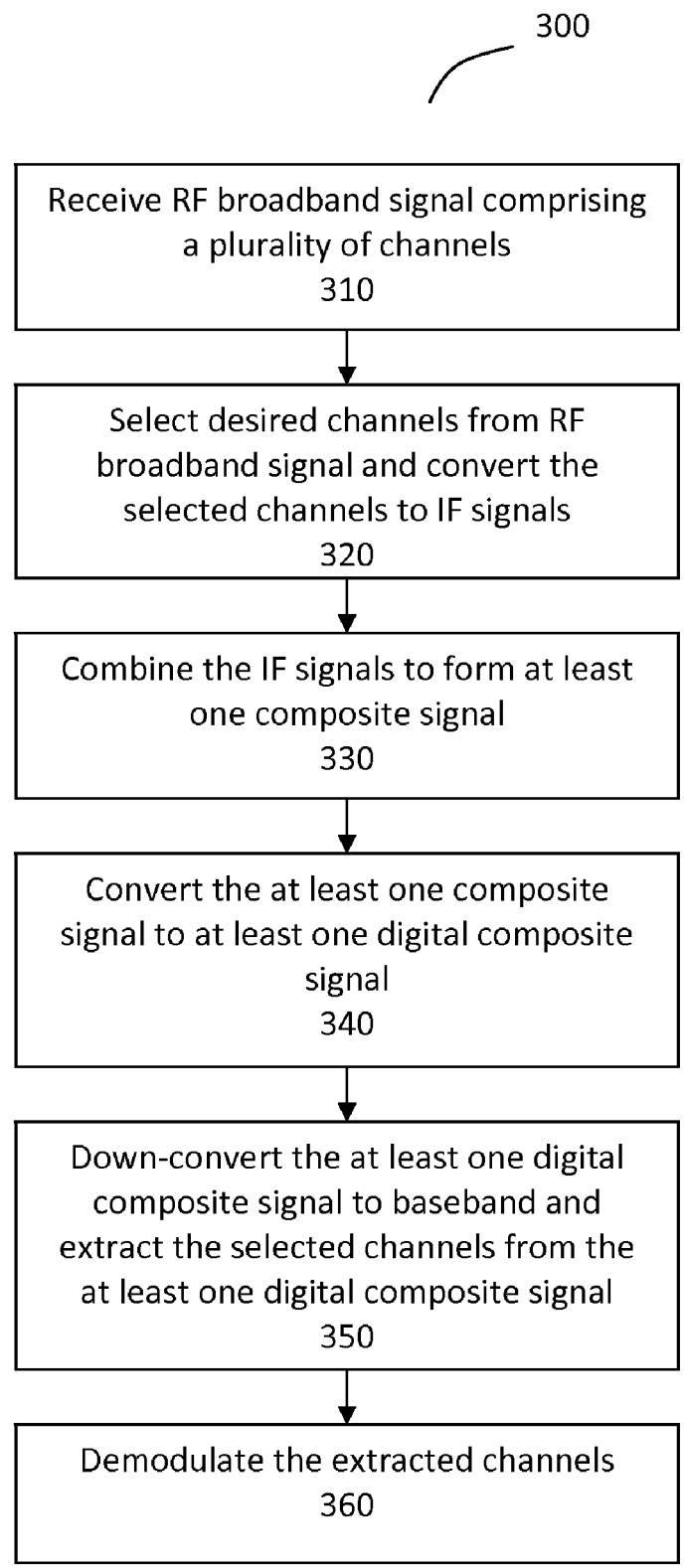
FIG. 3 shows an exemplary flowchart of operations performed by a receiver apparatus, in accordance with various aspects of the present disclosure.

FIG. 3 shows an exemplary flowchart of operations performed by a receiver apparatus, in accordance with various aspects of the present disclosure. In operation 310 an RF broadband signal may be received from a broadcast source by RF interface 210. In operation 320, at least one channel from the plurality of channels in the RF broadband signal may be selected by each of the tuners 220a, 220b, 220c, 220d. The respective selected channels may be converted to an intermediate frequency (IF) signal, a zero intermediate frequency (ZIF) signal, or a near-zero intermediate frequency (NZIF) signal by the tuners 220a, 220b, 220c, 220d. In operation 330, the signals, for example, IF signals from each of the tuners 220a, 220b, 220c, 220d, may be combined to form at least one composite signal by combining mechanism 230. In operation 340, the at least one composite signal may be converted to at least one digital composite signal by ADC 240. In operation 350, the at least one digital composite signal may be down-converted by each of DDCs 250a, 250b, 250c, 250d to a baseband signal centered at zero frequency. Each DDC may extract the desired selected channel associated with one of the tuners from the at least one digital composite signal using appropriate digital signal processing techniques in operation 350. In operation 360, the extracted channels may be demodulated to extract the original modulating data from the channels by demodulators 260a, 260b, 260c, 260d.

Although the above disclosure discusses what is currently considered to be a variety of useful embodiments, it is to be understood that such detail is solely for that purpose, and that the appended claims are not limited to the disclosed embodiments, but, on the contrary, is intended to cover modifications and equivalent arrangements that are within the spirit and scope of the appended claims.

What is claimed is:

1. A receiver apparatus comprising:
   an RF interface configured to receive a RF broadband signal comprising a plurality of channels;
   a plurality of tuners, each tuner of the plurality of tuners configured to select at least one channel from the plurality of channels and convert the selected channel to an intermediate frequency signal, wherein the plurality of tuners are configured to provide a plurality of intermediate frequency signals;
   a combining mechanism configured to receive and combine the plurality of intermediate frequency signals to form at least one composite signal; and
   an analog-to-digital converter configured to receive the at least one composite signal from the combining mechanism and convert the at least composite signal to at least one digital composite signal,
   wherein each of at least two of the plurality of intermediate frequency signals comprises components in a quadrature-phase relationship, such that the at least two intermediate frequency signals occupy a same frequency with opposite quadrature-phase relationships.

2. The receiver apparatus of claim 1, wherein the at least one composite signal comprises a substantially contiguous in-phase composite signal and a substantially contiguous quadrature composite signal, and wherein the combining mechanism is further configured to:
   separately combine an in-phase component of each of the plurality of intermediate frequency signals to form the substantially contiguous in-phase composite signal; and
   separately combine a quadrature component of each of the plurality of intermediate frequency signals to form the substantially contiguous quadrature composite signal.

3. The receiver apparatus of claim 2, wherein the analog-to-digital converter is further configured to:
   convert the substantially contiguous in-phase composite signal to an in-phase digital composite signal; and
   convert the substantially contiguous quadrature composite signal to a quadrature digital composite signal.

4. The receiver apparatus of claim 1, wherein the intermediate frequency signal includes at least one of a zero intermediate frequency signal or a near-zero intermediate frequency signal.

5. The receiver apparatus of claim 1, further comprising:
   a plurality of down-converters, wherein each down-converter of the plurality of down-converters is configured to extract the selected channel associated with one of the plurality of tuners from the at least one digital composite signal.

6. The receiver apparatus of claim 5, further comprising:
   a plurality of demodulators, wherein each demodulator is configured to receive the extracted selected channel from one of the plurality of down-converters and demodulate the extracted selected channel.

7. The receiver apparatus of claim 1, wherein frequency differences associated with the quadrature-phase components of the at least two intermediate frequency signals are of equal magnitude but opposite polarity.

8. The receiver apparatus of claim 1, wherein at least one of the plurality of intermediate frequency signals includes a near-zero intermediate frequency signal.

9. The receiver apparatus of claim 5, wherein the plurality of down-converters are configured to extract the selected channel associated with at least two of the plurality of tuners that generate the at least two intermediate frequency signals using a single sideband down-conversion technique.

10. A method comprising:
    receiving a RF broadband signal comprising a plurality of channels;
    converting each of the plurality of channels into an intermediate frequency signal to provide a plurality of intermediate frequency signals, wherein each of at least two of the plurality of intermediate frequency signals comprises components in a quadrature-phase relationship, such that the at least two intermediate frequency signals occupy a same frequency with opposite quadrature-phase relationships;
    combining the plurality of intermediate frequency signals to form at least one composite signal; and
    converting the at least one composite signal to at least one digital composite signal.

11. The method of claim 10, wherein the at least one composite signal comprises a substantially contiguous in-phase composite signal and a substantially contiguous quadrature composite signal, and wherein the combining the plurality of intermediate frequency signals further comprises:
    separately combining an in-phase component of each of the plurality of intermediate frequency signals to form the substantially contiguous in-phase composite signal; and
    separately combining a quadrature component of each of the plurality of intermediate frequency signals to form the substantially contiguous quadrature composite signal.

12. The method of claim 11, wherein converting the at least one composite signal further comprises:
    converting the substantially contiguous in-phase composite signal to an in-phase digital composite signal; and
    converting the substantially contiguous quadrature composite signal to a quadrature digital composite signal.

13. The method of claim 10, wherein the intermediate frequency signal includes at least one of a zero intermediate frequency signal or a near-zero intermediate frequency signal.

14. The method of claim 10, further comprising:
    extracting each of the plurality of channels from the at least one digital composite signal.

15. The method of claim 14, further comprising:
    demodulating the extracted selected channels.

16. The method of claim 10, wherein frequency differences associated with the quadrature-phase components of the at least two intermediate frequency signals are of equal magnitude but opposite polarity.

17. The method of claim 10, wherein at least one of the plurality of intermediate frequency signals includes a near-zero intermediate frequency signal.

18. A receiver apparatus comprising:
    an RF interface configured to receive a RF broadband signal comprising a plurality of channels;
    a plurality of tuners, each tuner of the plurality of tuners configured to select at least one channel from the plurality of channels, and at least one of the plurality of tuners configured to convert the selected channel to a non-zero intermediate frequency signal and the rest of the plurality of tuners configured to convert the respective selected channels to intermediate frequency signals;
    a combining mechanism configured to receive and combine the non-zero intermediate frequency signal and the intermediate frequency signals to form at least one composite signal; and
    an analog-to-digital converter configured to receive the at least one composite signal from the combining mechanism and convert the at least composite signal to at least one digital composite signal.

* * * * *